(No Model.) 2 Sheets—Sheet 2.

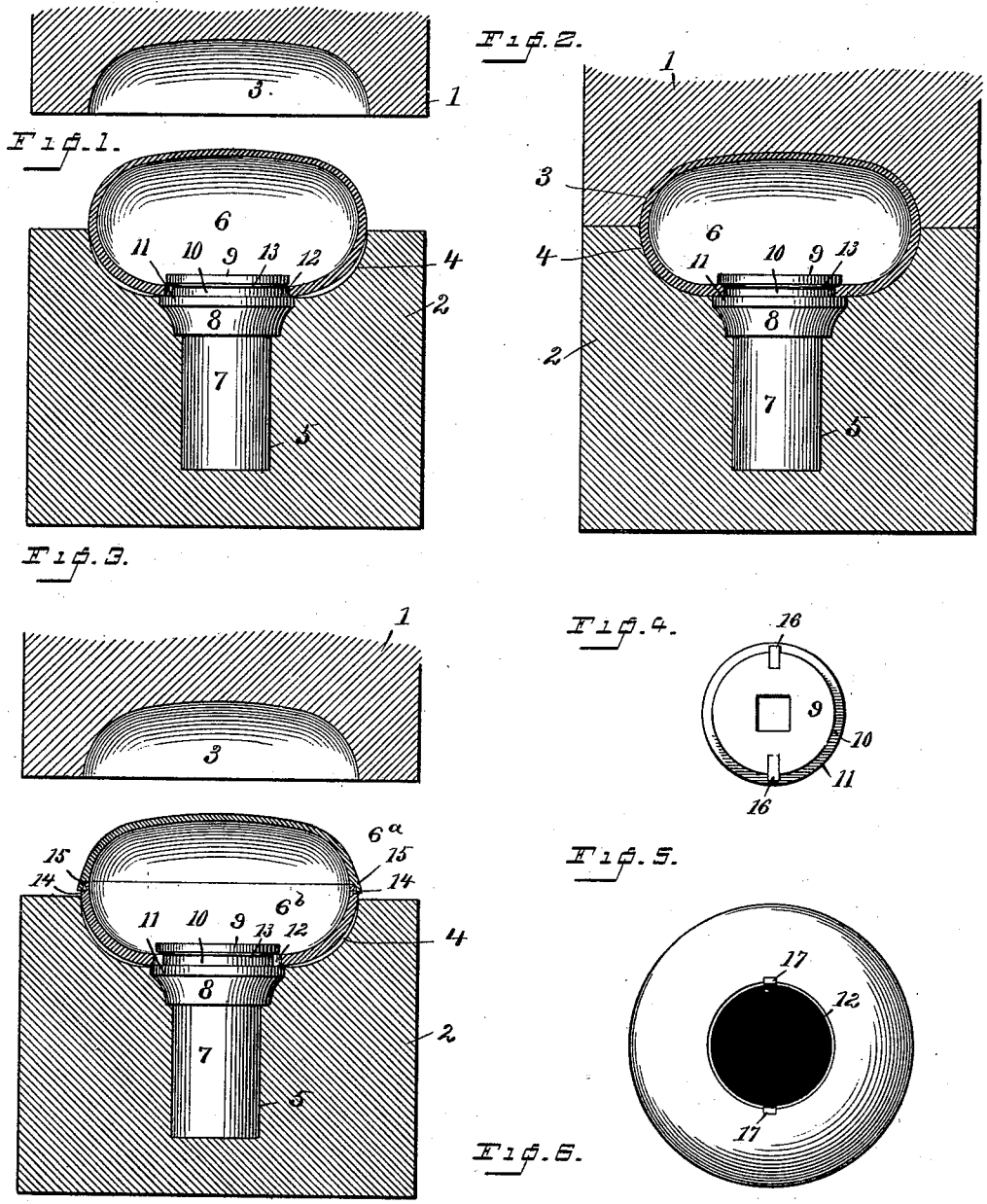

S. R. & F. A. WILMOT.
METHOD OF ATTACHING KNOBS OR HANDLES.

No. 447,266. Patented Feb. 24, 1891.

WITNESSES
C. M. Newman,
Asley P. Munson.

INVENTORS
Samuel R. Wilmot 2nd
Frank A. Wilmot
By H. M. Wooster
Atty.

UNITED STATES PATENT OFFICE.

SAMUEL R. WILMOT AND FRANK A. WILMOT, OF BRIDGEPORT, CONNECTICUT.

METHOD OF ATTACHING KNOBS OR HANDLES.

SPECIFICATION forming part of Letters Patent No. 447,266, dated February 24, 1891.

Application filed June 30, 1890. Serial No. 357,236. (No model.)

*To all whom it may concern:*

Be it known that we, SAMUEL R. WILMOT and FRANK A. WILMOT, citizens of the United States, residing at Bridgeport, in the county of Fairfield and State of Connecticut, have invented a certain new and Improved Method of Attaching Knobs or Handles; and we do hereby declare the following to be a full, clear, and exact description of the invention, such as will enable others skilled in the art to which it appertains to make and use the same.

Our invention has for its object to provide a novel method of attaching knobs or handles which shall be applicable to all hollow metallic knobs or handles having an opening in one side without regard to whether they are cast or made of sheet metal, whether they are made in one or more parts, or whether they are plain or figured, the sole requirements being that the metallic knob or handle be hollow and provided with an opening in one side.

With this end in view we have devised the simple and novel method which we will now describe, referring by numerals to the accompanying drawings, forming part of this specification, in which—

Figure 7:
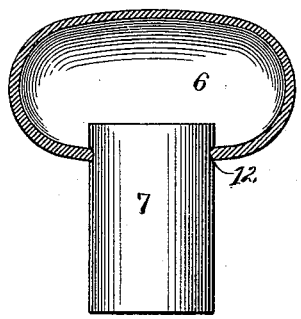
Figure 8:
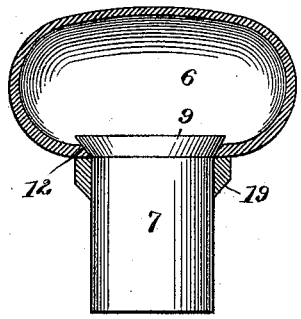
Figure 9:
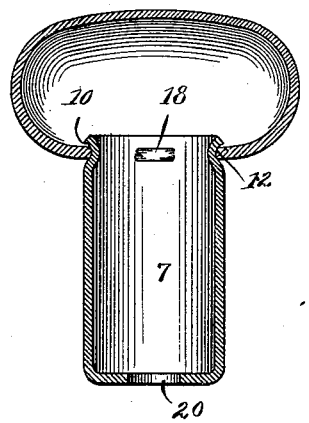

Figures 1 and 2 are cross-sections of closing-dies whereby our novel method is carried into effect, said views showing knobs and shanks and indicating the dies, respectively, in the open and closed positions. Fig. 3 is a view corresponding with Fig. 1, but illustrating in addition to the method of attaching the knob to the shank a method of attaching the parts of a knob together when made in two hemispherical parts; Fig. 4, a plan view of a knob-shank, illustrating a special means for locking the knob against turning on the shank, especially adapted for use in builders' hardware; Fig. 5, a plan view of the knob corresponding therewith; Fig. 6, a cross-section of a knob-shank, illustrating another way of preparing the shank so that the knob shall not turn thereon; Fig. 7, a view partly in section and partly in elevation showing a knob or handle attached to a shank by forcing the metal of the knob into the metal of the shank; Fig. 8, a similar view illustrating a form in which the shank is provided with a flange at its end and the knob held in position by an independent collar; Fig. 9, a view showing the application of our invention to a tool-handle, and Fig. 10 an elevation of the shank of a tool-handle detached.

1 denotes the upper closing-die, and 2 the lower closing-die. Either of these dies may be stationary. In practice the lower die is preferably fixed, the upper die reciprocating vertically. The upper die is provided with a dish-shaped recess 3, which is made just the shape and size of the outer half of the completed knob. The lower die is provided with a similarly-shaped recess 4, and at the bottom of said recess with an opening 5 of suitable shape and size to receive the shank to which the knob is attached.

6 denotes the knob or handle proper, which is formed to approximately its shape and size after attachment to the shank. In practice we preferably make the recesses in the dies of just sufficient diameter at their outer edges to receive the knob, but make the recesses shallower than the thickness of the knob before its attachment to the shank, so that when the dies are closed together the metal of the knob is necessarily compressed about the shank, which is denoted by 7.

8 denotes the usual collar or ring upon the shank which is used in hardware. The shank and collar may be made separately or in a single piece, as may be preferred, it being equally practicable to attach the knob to the collar and to attach the collar and knob afterward to the shank, or to make the collar and shank in a single piece, as shown in Figs. 1, 2, and 3.

12 denotes the opening in the knob or handle before its attachment to the shank. This opening in practice is made an inch, slightly more or less, in diameter.

The operation of attaching a knob is as follows: The shank is placed in opening 5 in the lower die, as clearly shown in Figs. 1, 2, and 3, and then the knob or handle is placed over the upper end of the shank and resting in recess 4 in the lower die. In this position the upper die descends, striking one or more blows, as may be required. The effect of the blow of the upper die is to press the opposite sides of the knob toward each other and to close the metal of the knob or handle inward tightly about the shank.

In Figs. 1 to 5, inclusive, we have illustrated a special adaptation of our invention to the attachment of metallic knobs to their shanks in the manufacture of builders' hardware.

In Figs. 1, 2, and 3 we have shown the outer end of the shank as provided with a flange 9. Just below this flange is a groove 10, and just below the groove is an inner flange of greater diameter than the outer flange. In practice in this form we have used the following diameters and find them well adapted to the embodiment of our invention: We make the shank at collar 9 about one inch in diameter, at the groove about fifteen-sixteenths in diameter, and at flange 11 about one and one-sixteenth inch in diameter. Opening 12 in the inner side of the knob is made slightly more than one inch in diameter, but much less than one and one-sixteenth inch in diameter, so that flange 9 will pass readily into the opening in the knob, but flange 11 will not pass into the opening. In this form we preferably provide a bevel 13 on the under side of flange 9. It will be noticed in the drawings that the metal of the knob or handle is perceptibly thicker upon the inner side than upon the outer side. This thickening of the metal is not an essential feature, although we preferably make it thicker upon the inner side, so as to give the greatest strength at just the point where the strain comes in use. The effect of the bevel upon flange 9 is to crowd the metal of the knob when it is pressed into the groove by the dies inward against flange 11, thus increasing the grip of the metal of the knob upon the shank and insuring a close joint between the knob and flange 11. In Fig. 3 we have shown the knob as made in two parts, denoted, respectively, by 6ª and 6ᵇ. The lower part of the knob, denoted by 6ᵇ, is provided near its upper edge upon the outer side with an undercut groove 14, and the upper part 6ª is cut away at its upper edge on the inner side, as at 15, so as to just fit over the edge of the lower part, as clearly shown in Fig. 3. The knob being made in two parts in this manner, when the upper die descends, in addition to closing the knob about the shank, the two parts of the knob will be locked firmly together, the reduced outer edge of part 6ª being forced tightly into the undercut groove in part 6ᵇ, so that the knob becomes in fact as solid as if made in a single piece. It is of course well understood that in the case of door-knobs the continual slamming to which the doors are subjected in long-continued use tends to loosen every part of the fixtures.

In order to render any loosening of the knob upon the shank when attached by our improved method practically impossible, we prepare either the knob or collar, or both, in some simple and inexpensive manner, so that the knob is locked upon the collar against torsional strain, and when the metal of the knob is closed inward upon the collar it shall be impossible for the knob to become loose in use.

In Fig. 4 we have shown the metal of flange 9 as struck inward and pressed down, so as to fill groove 10 at one or more places, the displaced metal forming lugs 16, which extend downward, so as to fill the groove, and outward beyond the face of flange 9, as clearly shown in Fig. 4. These lugs are adapted to engage notches 17, formed in the edge of the opening in the shell, as clearly shown in Fig. 5. When the knob and collar are in position, as in Figs. 1 and 3, the inner side of the knob will rest against flange 11 in precisely the same manner, the only difference being that lugs 16 will be in engagement with notches 17, so as to prevent the knob from turning on the collar. After the metal of the knob has been closed upon the collar, as already stated, the parts are as firmly united for all practical purposes as if originally made in a single piece. In practice we preferably use this means of locking the knob and collar together against torsional strain. We have, however, tried other means of locking the two parts together and found them thoroughly practical in use. For instance, the collar may be flattened upon its sides, as shown in Fig. 6, and in addition to being flattened it may be provided with prongs 18, so that when the metal of the knob is closed inward upon the collar the opposite sides of the prongs will be closely engaged by the metal of the knob, so as to render it practically impossible for the knob to become loose under long-continued jarring and torsional strain.

In Fig. 7 we have illustrated a less expensive form in which we have embodied our invention, this form being adapted to low-priced hardware. The shanks in this form can be either drawn or formed by curving a piece of sheet metal into tubular form, the metal of the shank in practice being ordinarily softer than the metal of the knob. In this form when the dies are closed together the metal of the knob is forced into the shank, as is clearly shown.

In Fig. 8 we have shown a form in which the shank is provided at its outer end with a flange 9, but the groove and inner flange are dispensed with. After the metal of the knob has been closed about the shank an independent ring or collar 19 is forced against the inner side of the knob and secured there in any suitable manner.

In Fig. 9 we have illustrated our invention as applied to the hollow shank of a tool-handle. This class of shanks may be formed by drawing blanks to cup shape and forming an opening 20 in the bottom of the cup to receive the tang of the tool. In this form the upper end of the shank may or may not be, but preferably is, provided with a groove 10, and the metal of the knob or handle is closed into this groove by the dies.

Figure 10:
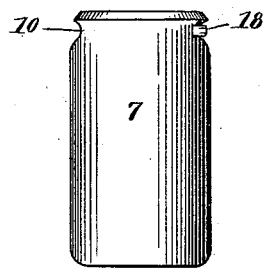

In order to lock the knob against the possibility of turning in use, we preferably form one or more prongs 18 in the groove by forcing out the metal of the shank from the inner side, as is clearly shown in Figs. 9 and 10.

Having thus described our invention, we claim—

1. The method of attaching hollow metallic knobs to shanks, which consists in forming an opening in the inner side of the knob, inserting the end of the shank into the opening, and then closing the metal of the knob tightly about the shank.

2. The method of attaching hollow metallic knobs to shanks, which consists in forming the knob of the required diameter and of greater thickness than the completed knob and forming an opening in the inner side thereof, then inserting the shank into the opening, and finally closing the metal of the knob inward upon the shank, whereby the thickness of the knob is reduced and the shank is firmly gripped.

3. The method of attaching knobs to shanks, which consists in forming a groove at the outer end of the shank, forming a hollow knob with an opening of sufficient diameter to receive the shank, and then closing the metal of the knob into the groove.

4. The method of attaching knobs to shanks, which consists in forming a flange at the outer end of the shank, a groove below the flange, and another flange below the groove of greater diameter than the outer flange, forming a hollow knob with an opening of sufficient diameter to receive the outer flange but not the inner flange, and then closing the metal of the knob into the groove between the flanges.

5. The method of attaching knobs to shanks, which consists in forming a flange at the outer end of the shank, a groove below the flange, and another flange below the groove of greater diameter than the outer flange, then striking in the metal of the outer flange to fill the groove in one or more places and form lugs extending outward beyond the edge of the outer flange, forming a knob with an opening of sufficient diameter to receive the outer flange but not the inner flange, forming notches in the edge of said opening to engage said lugs, and then closing the metal of the knob inward into the groove, whereby the knob is firmly locked to the shank.

6. The combination, with a shank having a flange at its outer end, a groove just below the flange, and just below the groove another flange of greater diameter than the outer flange, of a knob or handle having an opening of just sufficient diameter to receive the outer flange but not to receive the inner flange, the metal of said knob or handle being closed inward into the groove between the flanges, as and for the purpose set forth.

In testimony whereof we affix our signatures in presence of two witnesses.

SAMUEL R. WILMOT.
FRANK A. WILMOT.

Witnesses:
A. M. WOOSTER,
ARLEY I. MUNSON.